E. MATTMAN.
ROTOR CONSTRUCTION.
APPLICATION FILED MAY 31, 1907.
922,794.
Patented May 25, 1909.
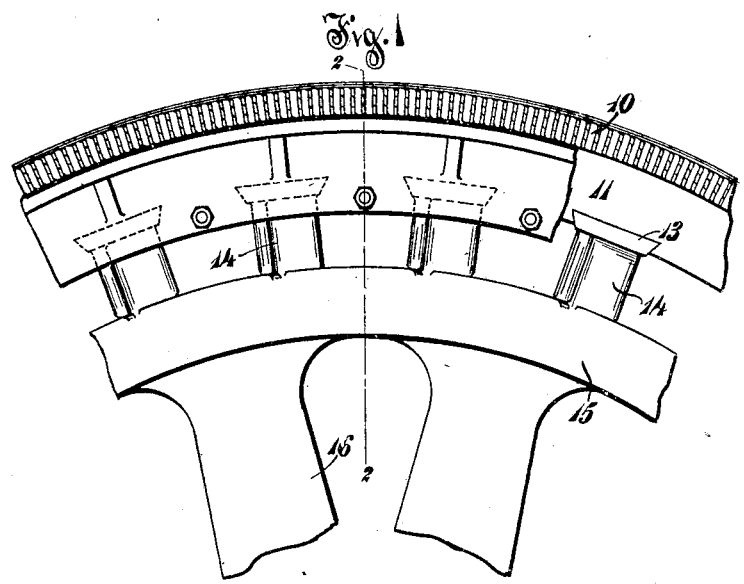
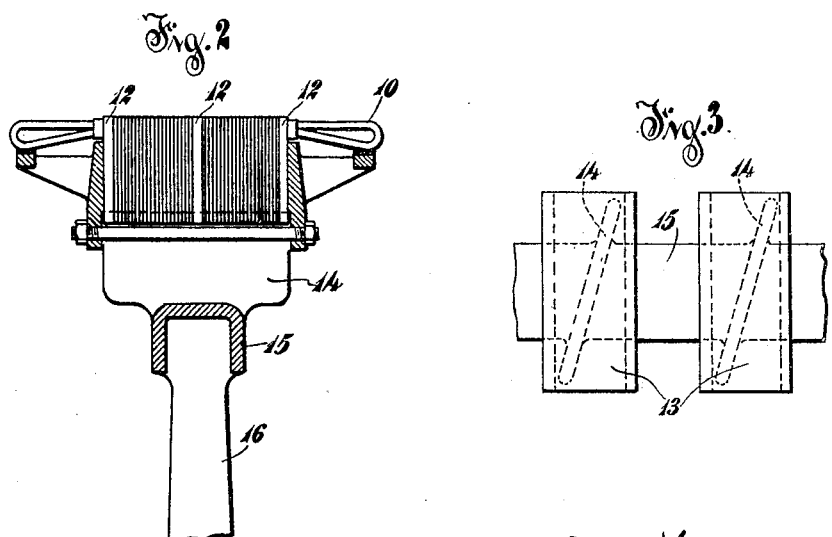
Witnesses
Oliver J. Sharman
Fred J. Kinsey
Inventor
Emil Mattman
By Chas. E. Lord
Attorney

UNITED STATES PATENT OFFICE.

EMIL MATTMAN, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

ROTOR CONSTRUCTION.

No. 922,794.      Specification of Letters Patent.      Patented May 25, 1909.

Application filed May 31, 1907. Serial No. 376,495.

*To all whom it may concern:*

Be it known that I, EMIL MATTMAN, citizen of the Republic of Switzerland, residing at Norwood, in the county of Hamilton and State of Ohio, have invented certain new and useful Improvements in Rotor Constructions, of which the following is a full, clear, and exact specification.

My invention relates to the ventilation of dynamo-electric machines.

In ventilating dynamo-electric machines the flow of air is often maintained by centrifugal force acting on the air in radial passageways in the rotating member.

It is the object of my invention to assist in this ventilation. This is accomplished by providing fan-blades just within the winding and core of the rotating member, these fan-blades being slightly skewed so that there is an axial flow of the air beneath the radial openings of the rotating member.

The specific novel features of my invention will appear from the description and drawings, and will be particularly pointed out in the claims.

Figure 1 shows a partial end view of a rotating member of a dynamo-electric machine embodying my invention. Fig. 2 is a section on the line 2—2 of Fig. 1; and Fig. 3 is a partial development of the spider.

The winding 10 of the rotating member of a dynamo-electric machine of any desired type is located in slots in the annular core 11. This core is provided with radial openings 12 and may be mounted on dove-tail extensions 13 of the slightly skewed ribs and fan-blades 14, arranged around the periphery of the rim 15 of the spider 16.

In the operation of the machine in either direction, the skewed fan-blades 14 cause a flow of air axially of the rotating member just within the core 11. This maintains a continuously fresh and cool body of air beneath said core. The radial flow of this cool air through the openings 12 readily keeps the windings 10 and core 11 cool.

Many modifications may be made in the precise construction shown and described without departing from the spirit and scope of my invention. All such I aim to cover in the following claims.

What I claim as new is:—

1. A rotating element of a dynamo-electric machine, comprising an annular laminated core provided with radial openings, a winding in slots in said core, a spider on which said core is mounted, and fan-blades around the periphery of said spider arranged to cause an axial flow of the air within said core.

2. A rotating element of a dynamo-electric machine, comprising a spider, a rim therefor, skewed fan-blades around the periphery of said rim, an annular core attached to said fan-blades, and windings on said core.

3. A rotating element of a dynamo-electric machine, comprising a spider, a rim therefor, skewed fan-blades around the periphery of said rim, an annular core attached to said fan-blades, and windings on said core, said core being provided with radial openings.

4. A rotating element of a dynamo-electric machine, comprising a central circular supporting member arranged for mounting on a shaft, skewed fan-blades around the periphery of said supporting member, an annular core attached to said fan-blades, and windings on said core.

5. A rotating element of a dynamo-electric machine, comprising a wheel provided with ribs around its periphery, said ribs being arranged at an angle to the axis of the wheel, an annular core mounted on said ribs, and windings on said core.

6. A rotating element of a dynamo-electric machine, comprising a wheel provided with skewed ribs around its periphery, an annular core dove-tailed to the outer ends of said ribs, and windings on said core.

In testimony whereof I affix my signature, in the presence of two witnesses.

EMIL MATTMAN.

Witnesses:
    GEO. B. SCHLEY,
    FRED J. KINSEY.